United States Patent

Chuang et al.

[11] Patent Number: 6,052,214
[45] Date of Patent: Apr. 18, 2000

[54] SYSTEM AND METHOD FOR PRODUCING AN ENHANCED IMAGE

[76] Inventors: Chih-Li Chuang, 8914 Polanco St., San Diego, Calif. 92129; David W. Kappel, 4834 Lehrer Dr., San Diego, Calif. 92117

[21] Appl. No.: 09/012,889

[22] Filed: Jan. 23, 1998

[51] Int. Cl.[7] .............................. G02F 1/03; G02B 5/30; G02B 27/28
[52] U.S. Cl. .................. 359/246; 359/484; 359/495; 359/496; 359/487
[58] Field of Search ................... 359/246, 484, 359/495, 496, 487; 353/33

[56] References Cited

U.S. PATENT DOCUMENTS

| | | | |
|---|---|---|---|
| 4,556,292 | 12/1985 | Mathyssek et al. | 350/394 |
| 4,746,201 | 5/1988 | Gould | 350/394 |
| 5,357,370 | 10/1994 | Miyatake et al. | 359/495 |
| 5,828,489 | 10/1998 | Johnson et al. | 359/487 |
| 5,943,167 | 8/1999 | Kelly | 359/487 |

*Primary Examiner*—Georgia Epps
*Assistant Examiner*—Adrianne Riviere
*Attorney, Agent, or Firm*—Higgs Fletcher & Mack; Bernard L. Kleinke

[57] ABSTRACT

An imaging system and method directs white light to a reflecting polarizing surface at an angle of incidence substantially equal to the Brewster angle to help maximize or greatly increase the reflected S polarized light and minimize or greatly decrease the reflected P polarized light. A contrast enhancing device also helps to reduce the reflected P polarized light. Color splitter and combining optics devices separate the reflected polarized light into a plurality of different color light components. Light modulating devices modulate each one of the color light components and rotate selectively the S polarized light and direct P polarized light toward a viewing surface. Thus, the output transmitted contrast ratio of the transmittal P polarized light to the transmitted S polarized light is enhanced.

19 Claims, 1 Drawing Sheet

SYSTEM AND METHOD FOR PRODUCING AN ENHANCED IMAGE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Technical Field

The present invention relates in general to a new and improved imaging system and method for producing an enhanced image. The invention more particularly relates to the projection of a full color image with enhanced brightness and contrast.

2. Background Art

Full color imaging systems, such as projection television systems, have in the past, employed three separate cathode ray tubes for each one of the red, green and blue light components. A large lens was employed for combining the various color components for projecting the full color image.

A more compact and less expensive imaging system was disclosed in Japanese patent 2,505,758. The patented system included a polarizing beam splitter and a prism optical arrangement to split the incident white light into three separate color components. Three separate liquid crystal display panels for each color modulated the individual light components. The three modulated light components were then reflected back to the beam splitter to, in turn, project the resulting full color combined image.

Such a polarizing system employs fewer components, and thus is less expensive to manufacture. When it is desirable to locate the projection system at various different distances from the viewing surface, such a system was also more readily focused onto a remote viewing surface, such as a screen.

However, the principal drawback of the patented system is that the brightness and contrast were not entirely satisfactorily. In this regard, if the brightness were increased, the contrast would degrade and could become less than acceptable for some applications.

The critical contrast characteristics in the patented system relate to the ratio of the reflected S component to the reflected P component of the light incident on the polarizing beam splitter surface. To increase the brightness, the reflected S component is increased, but the reflected P component would also increase. Thus, in order to have acceptable contrast, the brightness is reduced to an unacceptable level for many applications.

In the case of the patented system, the brightness is unacceptably low to achieve minimal acceptable contrast. In this regard, the throughput or Etendue is, by definition, equal to the solid angle times the light emitting aperture area. The size of the solid angle helps determine the amount of the brightness. However, by increasing the solid angle of the incident light to increase the brightness, the contrast becomes degraded. Thus, in a practical application of the patented system, the overall throughput would be greatly attenuated to achieve minimally acceptable contrast, and thus the brightness of the resulting image is degraded and can be less than acceptable for many applications.

Therefore, it would be highly desirable to have a new and improved compact imaging system, which achieves an enhanced brightness, as well as an enhanced contrast of the full color image.

SUMMARY OF THE INVENTION

Therefore, the principal object of the present invention is to provide a new and improved compact imaging system and method, wherein the brightness and contrast of the resulting image is greatly enhanced.

Briefly, the above and further objects of the present invention are realized by providing an imaging system and method wherein both the brightness and contrast are enhanced in a polarized system.

An imaging system and method directs white light to a reflecting polarizing surface at an angle of incidence substantially equal to the Brewster angle to help maximize or greatly increase the reflected S polarized light and minimize or greatly decrease the reflected P polarized light. A contrast enhancing device also helps to reduce the reflected P polarized light. Color splitter and combining optics devices separate the reflected polarized light into a plurality of different color light components. Light modulating devices modulate each one of the color light components and rotate selectively the S polarized light and direct P polarized light toward a viewing surface. Thus, the output transmitted contrast ratio of the transmittal P polarized light to the transmitted S polarized light is enhanced.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawing, wherein.

BEST MODE FOR CARRYING OUT THE INVENTION

Figure 1:
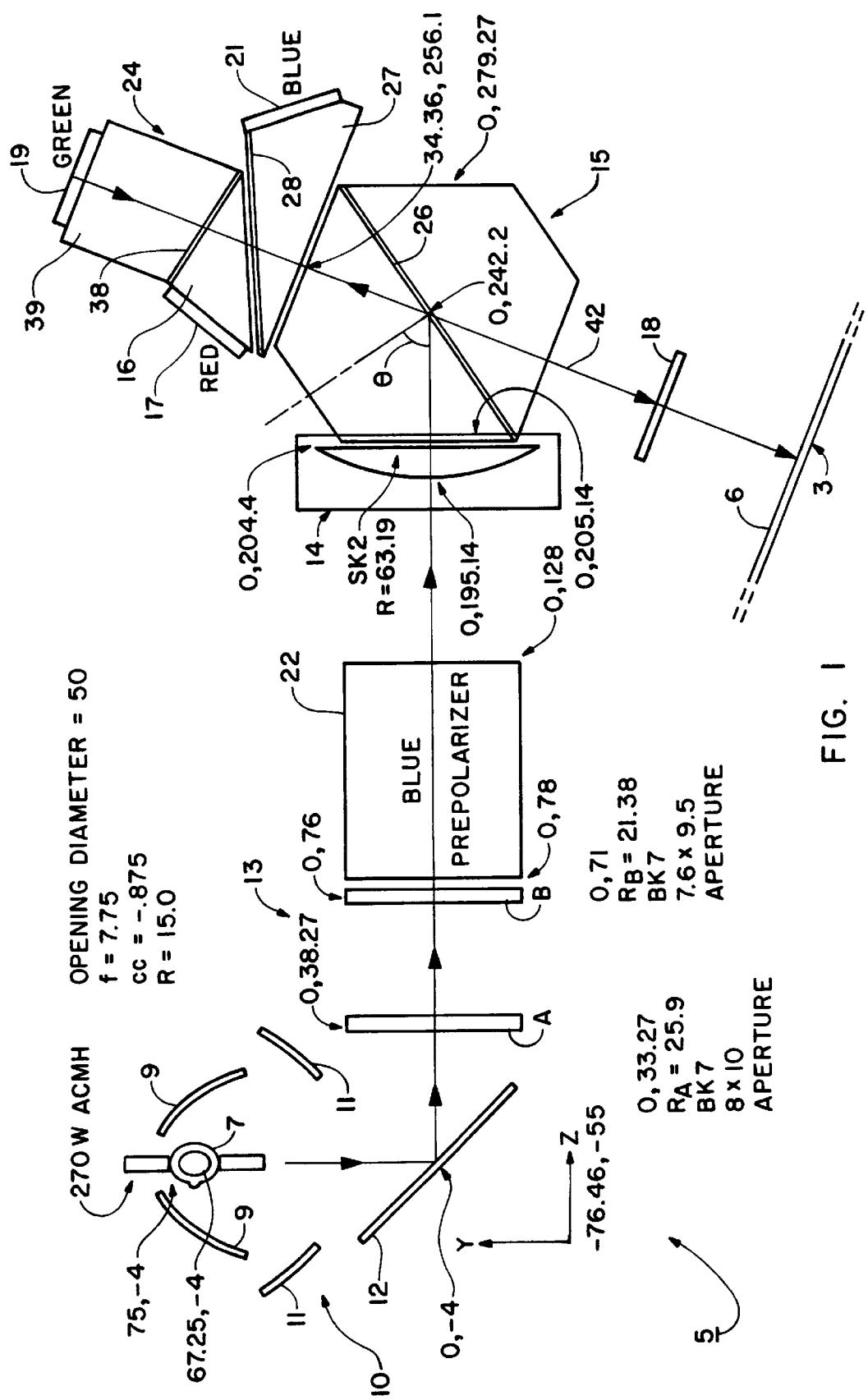
FIG. 1 is a block diagram of an imaging system, which is constructed in accordance with the present invention.

Referring now to the drawing, there is shown an imaging system 5, which is constructed in accordance with the present invention, and which is adapted to project an enhanced full color image onto a viewing surface 6 of a screen 3. The imaging system 5 is compact in size, and is characterized by a bright image with high contrast.

The system 5 includes a white polarizing beam splitter 15 for reflecting polarized light therefrom. A light source generally indicated at 10 includes a high intensity lamp 7, a rear elliptical collecting section 9 and a front spherical section 11. The light source 10 directs white light to the beam splitter 15 to reflect polarized light therefrom. The light source 10 directs the principal axis of the white light onto the beam splitter 15 at an angle of incidence θ relative to a normal axis to a reflective coating 26 of the beam splitter 15. In accordance with the present invention, the angle θ is equal to the Brewster angle to help provide an enhanced reflection of S polarized light and a minimized or greatly decreased reflection of P polarized light so that the reflected contrast of the ratio of the reflected S polarized light to the reflected P polarized light is maximized or greatly increased. The Brewster angle is defined to be the angle of incidence which is equal to the arc tangent of N (the index of refraction).

By directing the principal axis or the chief ray of the white light onto the reflective coating 26 of the polarizing beam splitter 15 at an angle of incidence equal to the Brewster angle, all or substantially all of the reflected light is S polarized light with very little if any P polarized light being reflected. The P polarized incident light is transmitted through the reflective coating 26 and is eliminated thereby. As a result, the input reflected contrast of the ratio of the reflected S polarized light to the reflected P polarized light is as large as possible, since the hard to eliminate reflected P polarized light is entirely or to a great extent eliminated in accordance with the present invention. Additionally, by setting the angle of incidence of the chief ray of the light onto the polarizing beam splitter 15 at the Brewster angle, the solid angle of the incident light can be increased significantly with less degrading of the contrast. As the solid angle is increased to achieve a corresponding increase in brightness, the contrast is degraded somewhat due to the increase in the other rays in the cone of light being spaced away from the chief ray directed at the Brewster angle. However, reduction in contrast is significantly smaller as compared to a system where the chief ray is directed at an angle other than the Brewster angle. Thus, a large Etendue or throughput can be utilized with little sacrifice to contrast. In this regard, the light source 10 can be configured with a large light emitting aperture area with a large solid angle. As a result, the resulting image is very bright, and the contrast is enhanced and not degraded.

In order to help ensure that the reflected P polarized light from the reflective coating 26 of the polarizing beam splitter 15 is eliminated or minimized, a contrast enhancing device in the form of a prepolarizing beam splitter 22 polarizes the light from the light source 10. In this regard, the prepolarizing beam splitter 22 is crossed relative to the polarizing beam splitter 15, whereby all or substantially all of the S polarized light from the prepolarizer beam splitter 22 is directed toward the polarizing beam splitter 15, and all or substantially all of the P polarized light is directed away therefrom to effectively eliminate it. Thus, due to the combination of the prepolarizing beam splitter 22 and the arrangement of the angle of incidence onto the polarizing beam splitter 15 substantially at the Brewster angle, according to the invention, according to the invention, very little if any reflected P polarized light is emitted by the beam splitter 15, thereby resulting in a favorable input reflected contrast for the system 5.

A color splitter and combiner arrangement generally indicated at 24 separates the light reflected from the beam splitter 15 into a plurality of different color light components. In this regard, the reflected light is separated into red, green and blue spectral components. A set of three light modulating devices comprising a red reflective high resolution light modulator 17, a green reflective high resolution light modulator 19, and a blue reflective high resolution light modulator 21. The light modulators 17, 19 and 21 modulate each one of the three different color light components. The modulators rotate selectively S polarized light to direct modulated P polarized light toward the viewing surface 6 so that the output transmitted contrast ratio of the transmitted P polarized light to the transmitted S polarized light is enhanced. In this regard, the light modulators, in the form of liquid crystal display panels or the like, rotate light from S polarized light to P polarized light, which is transmitted. Substantially all of the transmitted light P polarized light, and only a very small amount of S polarized light is transmitted. Some of the S polarized light is also reflected, and thus the transmitted S polarized light is insignificant, and thus the output transmitted contrast ratio of the P polarized transmitted light to the S polarized transmitted light is very large, and the incident white light throughput is also large. The resulting image displayed on the viewing surface 6 is bright with very desirable contrast.

In order to illustrate the effect of the angle of incidence relative to the input reflected contrast ratio, in the following Table 1, various different angles of incidence for the system 5 are illustrated relative to the various values of input reflected contrast:

TABLE 1

| Angle of Incidence | Reflected S/Reflected P |
| --- | --- |
| 57° | 600:1 |
| 56° | 450:1 |
| 50° | 150:1 |
| 45° | 200:1 |
| 42° | 50:1 |

It can be seen from Table 1, that at the Brewster angle (57°), the largest input reflected contrast ratio is achieved.

Considering now the system 5 in greater detail, a dichroic turning mirror 12 directs the white light from the light source 10 through a lens array generally indicated at 13 to the prepolarizing beam splitter 22. The ray 13 includes a pair of arrays A and B. The lens array 13 divides a circular beam of white light into a plurality of rectangular beamlets to direct them onto the polarizing beam splitter 15, which in turn reflects and polarizes the light for the light modulators. A collimating lens 14 disposed in the light path between prepolarizing beam splitter 22 and the polarizing beam splitter 15 collimates the diverging lens array beamlets at the polarizing beam splitter 15.

The color splitter and combiner arrangement 24 includes a Phillips prism 16, which separates the reflected S polarized light from the polarizing beam splitter 15 into separate red, blue and green spectral components for the respective light modulators 17, 19 and 21. The color splitter and combiner arrangement includes a prism 27 having a blue dichroic coating 28 for directing the blue component to the blue light modulator 21. A red/green dichroic coating 38 between the Phillips prism and a prism 39 facilitates the directing of the red and green components to the respective light modulators 17 and 19. The reflected S polarized light from the three light modulators are combined by the Phillips prism 16 and directed along an optical path 42 through the polarizing beam splitter 15 and a projection lens 18 for projecting the full color image onto the viewing surface 6. It should be understood that the reflected S polarized light from the polarizing beam splitter 15 extends along the same common optical path 15 into the color splitter and combiner arrangement 24, and then the rotated P polarized light reflected from the light modulators are recombined in the Phillips prism 16, which directs the combined full color light along the common optical axis 42 through the beam splitter 15 and the projection lens 18 to focus the image onto the viewing surface 6.

The additional polarizing beam splitter is a 22 blue prepolarizer for greater performance, and enables ease of manufacturing.

In use, the reflector 11 collects light from the light source 10 and sends it in converging manner toward turning mirror 12. The turning mirror 12 reflects visible light and transmits infrared light to reduce heat loading. The lens arrangement 13 divides the circular beam into a plurality of rectangular beamlets and superimposes them onto the spatial light modulator, thus redistributing a non-uniform light profile into a uniform one. This process is accomplished with the aid of the collimating lens 14, which collimates the diverging lens array beamlets.

The beamlets are separated into a reflected S polarization and a transmitted P polarization at the polarizing beam splitter 15. The transmitted P polarization is not used. The reflected S component is separated into red, blue and green spectral components at the Phillips prism 16. The red, blue and green spectral components are directed to the reflective spatial light modulators such as the modulator 19. The spatial light modulators in the ON state rotate the polarization and redirect the beam back through the Phillips prism 16. The spectral components are recombined and then transmitted through the polarizing beam splitter 15 to the projection lens 18 which images the spatial light modulators onto a viewing surface, such as the screen 3 for viewing by an audience. In the OFF state, the spatial light modulator does not rotate the polarization and the unrotated beam is reflected by the polarizing beam splitter 15 and does not transmit through the projection lens 18 to the screen 3.

The system is optimized to deliver light of + or −10 degree beam spread to the screen. The reflector focal length and aperture of 50 mm is designed to redirect light from the light source 10 through the lens arrays 13 to the panels 17, 19 and 21 with about 70% efficiency. The size of the beam at the lens arrays 13 compared to the focal length of the collimating lens 14 yields beam spread of + or −10 degrees.

The polarizing beam splitter 15 is designed to function with all spectral components and over an angular beam spread of + or −10 degrees. The beam splitter 15 is composed of high index glass (SF2, 1.65 index) and 3 material thin film coating.

The polarizing beam splitter prepolarizer 22 and the polarizing beam splitter 15 are liquid filled with fused silica index matching fluid in order to reduce thermally induced birefringence which cause unwanted polarization rotation and degrades the image by reducing contrast. The prepolarizer 22 is crossed relative to the polarizing beam splitter 15, thereby reducing the complexity of the design, since it is easier to produce a polarizing beam splitter with high S polarized light reflection and difficult to produce a polarizing beam splitter with low P polarized light reflection. Input contrasts is the ratio of S polarized reflected light to P polarized reflected light. Output contrast is the ratio of P polarized light transmitted to S polarized light transmitted. It is much easier to get high transmitted contrast than reflected contrast. The crossed prepolarizer/polarizer arrangement of the present invention takes advantage of this fact so that there is a compromise of only a small percent in P transmission, but is far less significant than the contrast considerations.

The Phillips prism 16 functions at low angles of incidence and can therefore be used as a color separator for S polarized light and as a color combiner for the output P polarized light. Because there is a shift between S and P which increases with increasing angle of incidence, it is necessary to use the Phillips prism 16 for an optical device which functions both as a splitter and combiner.

The projection lens in one implementation is fixed and telecentric through the cubes. The f/# is f/3 and the fov is about 40 degrees. It should be understood that the projection lens can be alternatively a zoom lens, and there is an intermediate image which is tilted to eliminate keystone distortion at 17 degrees.

The optical arrangement is compact in size because of the use of a single polarizing beam splitter 15 for the entire spectrum.

The optical characteristics of the various components of the system 5 are included in FIG. 1 of the drawing.

While particular embodiments of the present invention have been disclosed, it is to be understood that various different modifications are possible and are contemplated within the true spirit and scope of the appended claims. For example, while the contrast enhancing means of the present invention shown and described herein includes a prepolarizer, the contrast enhancing means may also include other devices such as the white beam splitter coating 26 may be composed of material designed to reduce reflected P polarized light therefrom. There is no intention, therefore, of limitations to the exact abstract or disclosure herein presented.

What is claimed is:

1. An imaging system for forming an image on a viewing surface, comprising:
    white polarizing beam splitter means for reflecting polarized light therefrom;
    light collection means for directing white light to said beam splitter means to reflect polarized light therefrom;
    said light collection means for directing the principal axis of the white light onto said beam splitter means at an angle of incidence substantially equal to the Brewster angle to help provide an enhanced reflection of S polarized light and a minimized or greatly decreased reflection of P polarized light so that the reflected contrast of the ratio of the reflected S polarized light to the reflected P polarized light is maximized or greatly increased;
    contrast enhancing means for also helping to reduce the P polarized light reflected from said beam splitter means;
    color splitter and combining means for separating the light reflected from said beam splitter means into a plurality of different color light components; and
    light modulating means for modulating each one of said color light components and for rotating selectively S polarized light to direct modulated P polarized light toward said viewing surface so that the output transmitted contrast ratio of the transmitted P polarized light to the transmitted S polarized light is enhanced.

2. A system according to claim 1, wherein said contrast enhancing means includes prepolarizing means cross polarized relative to said white polarizing beam splitter means to supply S polarized light thereto and to minimize or greatly decrease P polarized light supplied thereto.

3. A system according to claim 2, wherein beam splitter means and said prepolarizing means include fused silica index matching fluid to reduce thermally induced birefringence, thereby reducing unwanted polarization rotation.

4. A system according to claim 1, wherein said color splitter and combining means includes a Phillips prism for separating S polarized light and for combining color components for output P polarized light.

5. A system according to claim 1, further including lens array means for dividing the white light from said light collection means into a plurality of rectangular beamlets.

6. A system according to claim 4, further including a collimating lens for focusing said beamlets onto said light modulating means via said beam splitter means and said color splitter and combining means.

7. A system according to claim 1, wherein said light modulating means comprise reflective light modulating means for rotating selectively the S polarized light between ON and OFF states and for directing the rotated P polarized light back through said color splitter and combining means.

8. A system according to claim 1, wherein said plurality of light components comprise red, blue and green light components, said light modulating means comprising red, blue and green light modulators for each one of said light components.

9. A system according to claim 1, wherein said angle of incidence is about 57 degrees.

10. A system according to claim 1, further including projection lens means for focusing the image onto the viewing surface.

11. A method of forming an image on a viewing surface, comprising:

reflecting polarized light from a reflecting surface;

directing white light onto the reflecting surface to reflect polarized light therefrom;

directing the principal axis of the white light onto the reflecting surface at an angle of incidence substantially equal to the Brewster angle to help provide an enhanced reflection of S polarized light and a minimized or greatly decreased reflection of P polarized light so that the reflected contrast of the ratio of the reflected S polarized light to the reflected P polarized light is maximized or greatly increased;

helping reduce the P polarized light reflected from the reflecting surface;

separating the reflected polarized light reflected from the reflecting surface into a plurality of different color light components; and modulating each one of said color light components and for rotating selectively S polarized light to direct modulated P polarized light toward said viewing surface so that the output transmitted contrast ratio of the transmitted P polarized light to the transmitted S polarized light is enhanced.

12. A method according to claim 11, wherein said helping reduce includes prepolarizing the white light to supply S polarized light to the reflecting surface and to minimize or greatly decrease P polarized light supplied thereto.

13. A method according to claim 1, wherein said separating includes separating with the use of a Phillips prism S polarized light and combining color components for output P polarized light.

14. A method according to claim 1, further including dividing the white light into a plurality of rectangular beamlets.

15. A method according to claim 14, further including focusing said beamlets.

16. A method according to claim 1, further including directing reflectively the rotated P polarized light back toward the viewing surface.

17. A method according to claim 1, wherein said light components are red, green and blue.

18. A method according to claim 1, wherein said angle of incidence is about 57 degrees.

19. A method according to claim 1, further including focusing the image onto the viewing surface.

* * * * *